2,823,163

ANTIVAGINITIS PROCESS AND CATION EXCHANGE RESIN COMPOSITION

Richard K. Thoms, Storrs, Conn.

No Drawing. Application October 11, 1956
Serial No. 615,242

10 Claims. (Cl. 167—58)

This invention relates to an improved method for the treatment of certain infections of the vagina, whereby there is established and maintained a pH of around 3.5 to 5.0 of the vaginal mucosa for prolonged periods of time. The invention also includes compositions particularly adapted for use in such process.

A finding confirmed repeated by many gynecologists is that certain infections of the vagina tend to increase the pH of the mucosa of that organ from a normal value approximating 4.0 to a value around 7.0 and occasionally around 8.0 or higher. This makes conditions optimal for the invading organism and inhibits the normal flora.

In the treatment of such infections it has been proposed to administer locally an acid or a buffer to lower the pH and reverse conditions with respect to the pathogens and the normally occurring microorganisms, and to use acid buffers as adjuvants to anti-infective agents; but such methods of treatment are of limited effectiveness because of the difficulty of maintaining the proper pH for a sufficient time.

The improved process of the present invention is based upon the discovery that certain cationic exchange resins, when properly prepared or treated, will, when introduced into the pathological vagina in adequate dosage amounts, and under appropriate conditions, maintain the pH of the vaginal mucosa close to the value of 4.0, or within the range of 3.5 to 5, to inhibit pathologic organisms. The process of the present invention makes it possible to reduce the pathological pH of the vagina to around normal and hold it for a prolonged period of time, to kill off or inhibit the growth of pathogens and reestablish normal pH conditions.

The cationic exchange resins which are used in the present process, and in making the new compositions, are resins of the carboxylic acid type that will produce a pH of around 2.8 or greater in physiological saline solution or in Ringer's solution, and which have the ability of combining with a substantial amount of alkaline ions in the pH range between 3.5 and 5.0.

Such carboxylic acid cation exchange resins in the free acid form may have a pH of e. g. around 2.2 or less, and resins which have a pH of less than about 2.8 will cause ulceration when applied to the vaginal mucosa. Accordingly, such resins are adjusted to a pH of around 2.8 to 3.5 before use. This adjustment can be effected by adding a regulated amount of caustic soda to raise the pH from that of the acid form to that desired; or admixtures of the carboxylic acid cation exchange resin in the acid form can be made with such resins in the form of the sodium salt in proper proportions to give a mixture which, in physiological saline solution or in Ringer's solution, will give a pH of around 2.8 to 3.5. The cation exchange resins used in the process and in the new compositions have the property of taking up sufficient amounts of alkalis or of cations in the pH range of 3.5 to 5.0.

In carrying out the improved process, a sufficient amount or dosage of the cationic resin is used to insure prolonged action. The amount of resin used may thus vary from as low as 120 mg. in some cases to as high as 5 grams. An advantageous amount is around 0.5 to 1.0 gram per dose or treatment, with certain resins, and larger amounts with other resins.

The cation exchange resins are insoluble in the vaginal mucosa. They are used in finely powdered form, e. g., passing through a 200-mesh sieve. They are used in carrying out the present process by introducing an adequate amount or dosage of the resin into the vagina in a manner or in a form which insures distribution of the resin in the vaginal mucosa. Amounts or dosages of around 0.5 to 1.0 grams have been found to lower the pH of the vaginal mucosa to around normal or within the range of 3.5 to 5, and to maintain this for prolonged periods of time, e. g., for around 24 hours.

An advantageous form of carboxylic acid cation exchange resin is the resin known under the trade name "Amberlite XE112," which is a carboxylic acid cation exchange resin which is a copolymer of a modified acrylic acid with a bifunctional vinyl aromatic cross linking agent such as divinyl benzene. See U. S. Patent No. 2,340,111. Such a resin, when entirely in the acid form, has a pH of around 2.2 or less depending on the conditions of testing, and materials having a pH of 2.8 or less will cause ulceration when applied to the vaginal mucosa. Accordingly, it is necessary to adjust the pH of such a resin upward, as by reacting the resin with sodium hydroxide, to form a partial salt having a pH of around 3.5 or somewhat higher.

The testing of the resin to determine its preliminary treatment and its suitability for use in the new process is readily accomplished by a screening test in which the resin is suspended in Ringer's solution, to provide neutral salts, in a concentration of 2 grams of resin to 100 cc. of solution and determining the pH of this suspension with a glass electrode pH meter while stirring. The sodium hydroxide, 1 N in Ringer's solution, is added in increments of 0.5 and 1.0 milliequivalents per gram of resin, and the pH determined after each addition. In the case of the "Amberlite XE112" tested by this procedure, it was found that 1.2 milliequivalents of sodium hydroxide per gram of resin, when allowed to react with the resin, gave a resulting product which when mixed with enough distilled water to form a barely stirrable mush (10 grams of resin with distilled water added to form 40 cc.) had a pH of 4.4, whereas the initial resin in the acid form had a pH of 2.1.

When this resin was treated with increments of sodium hydroxide solution as above described, it was found that the addition of 1 milliequivalent of sodium hydroxide increased the pH from 2.1 to around 3.9, and the pH did not increase above 5.0 until about 4.5 milliequivalents of sodium hydroxide were added. These tests indicate that within the range of 3.5 to 5.0 the resin has the ability to combine with a considerable amount of alkaline ions with only a small change in pH.

Instead of preparing the resin by the addition of a regulated and limited amount of sodium hydroxide to the resin in acid form, the same or a similar result can be obtained by admixing the resin in acid form with a small and regulated amount of the resin in the form of the sodium salt to give a mixture which, when tested in physiological saline solution or in Ringer's solution, gives a pH of around 2.8 to 3.5.

Other carboxylic acid cation exchange resins capable of combining with a considerable amount of alkaline ions within the pH range of 3.5 to 5.0 can be used, and the amount of resin required can be determined by titration tests such as described above. In general, an amount of the resins should be used having the ability to combine with at least 0.25 milliequivalent of caustic soda within the 3.5 to 5.0 pH range; but advantageously larger amounts of resin are used which will give a more prolonged maintenance of the desired pH range, such as amounts equal to 0.5 milliequivalent of caustic soda, and even better results with amounts capable of neutralizing at least 1.0 milliequivalent, or even larger amounts, e. g., 2 to 4 milliequivalents. A titration of the resin within the pH 3.0 to pH 5.0 range can readily be carried out, and the proper dosage of the resin determined by the results of the titration.

Other carboxylic acid cation exchange resins can thus be used, such as the resins sold by Rohm & Haas under the trade names "Amberlite XE–64–10," "Amberlite XE–64," "Amberlite XE–64–X," "Amberlite XE–64–Y," "Amberlite XE–64–Z" and "Amberlite IRC–50." The amounts of these and other carboxylic acid cation exchange resins having the capacity of reacting with adequate amounts of alkaline ions within the 3.5 to 5.0 pH range can be determined by the titration method above indicated, and by using an amount of resin, based on the results of the titration, sufficient to give the necessary neutralizing capacity.

The carboxylic acid cation exchange resins, when properly prepared and adjusted as to their initial pH and used in adequate dosage amounts, can be used by different methods of administration.

Thus, the resins in finely powdered form can be administered by insufflation to introduce e. g. 0.5 gram of the resin and to distribute it over the vaginal mucosa. One example of a suitable powder for insufflation is a mixture of 90 parts of the above resin, "Amberlite XE112," in acid form, and 10 parts of the same resin in the form of the sodium salt, admixed and passed through a 200-mesh sieve. In using such mixture, an adequate amount, e. g., 0.5 gram, is introduced into the vagina by insufflation.

The resins are advantageously diluted with a suitable diluent before use, and lactose is an advantageous diluent for use with the powdered resins when introduced by insufflation. An example of such a diluted resin is made of 30 parts by weight of the above resin, "Amberlite XE112," in acid form, 3 parts by weight of the same resin in the form of its sodium salt, and 67 parts by weight of lactose. These ingredients are mixed and passed through a 200-mesh sieve, and the resulting powder containing the diluted resin is then suitable for use by insufflation, using e. g. an amount of resin of around 0.5 gram or somewhat more.

Instead of using the resins in powdered form by insufflation, they may be combined with other diluents or vehicles and used in the form of creams, suppositories, or tablets. A vaginal cream can thus be made of the following ingredients in the following parts by weight: tragacanth powder U. S. P.—2.5 gm.; acacia powder U. S. P.—.6 gm.; glycerin U. S. P.—10.0 cc.; methyl parabenze U. S. P.—.02 gm.; "Amberlite XE112"—18.0 gm.; "Amberlite XE112 Na"—2.0 gm.; and distilled water—75.0 cc.

Such a composition is compounded by suspending the tragacanth, acacia, and 10 grams of the "Amberlite XE112" in the glycerin, dissolving the methyl parabenze in the distilled water, adding the methyl parabenze solution to the glycerin suspension while stirring, and stirring in the remainder of the "Amberlite XE112" and the "Amberlite XE112 Na." 106 grams of the composition contains 20 grams of the resin mixture. In using such a cream, an amount of the cream is introduced into the vagina through an appropriate applicator and in proper dosage of e. g. 0.5 gram of the resin mixture or somewhat more.

The resins are advantageously used in the form of suppositories, such that one suppository will provide a suitable dosage of the resin, e. g. 0.5 to 1.0 gram. A vaginal suppository can thus be formed from the above resin used in part in acid form and in part as a sodium salt, and having the following composition: polyethylene glycol 4000—5.0 gm.; polyethylene glycol 1000—15.0 gm.; "Amberlite XE112"—9.0 gm.; and "Amberlite XE112Na"—1.0 gm.

Such suppositories may be made by mixing the two Amberlite resins (the acid form and the sodium salt) and passing through a 200-mesh sieve, melting the two polyethylene glycols together at low heat, mixing the Amberlites and the polyethylene glycols, and pouring the resulting suspension into suppository mods. This formula makes 15 suppositories, each containing two-thirds of a gram of the resin mixture.

The resins can advantageously be prepared in the form of tablets or molded products containing the resin with its pH adjusted as above described, and in proper dosage amount, and containing diluents and particularly a small amount of salt, a considerable amount of lactose, and a water-soluble binder.

The neutral salt content of the vaginal mucosa is largely unknown and probably varies with the pathological conditions. The pH of a suspension of the resin in a neutral salt solution is somewhat lower than the pH of a suspension in water. It is advantageous to add a small and limited amount of salt to the resin composition. When as much as 0.3 gram of sodium chloride per gram of resin was added, the pH value changed from around 4.4 to around 3.0; but this represents a much higher salt concentration than that in the vaginal mucosa. In trying various concentrations of sodium chloride, it was found that when 0.05 gram of sodium chloride per gram of resin was present, the pH of the mush above referred to was around 3.5. In general, there is no danger of having too much neutral salt in the vaginal mucosa, but it is advantageous to add a small amount of sodium chloride, e. g. 0.05 gram of sodium chloride per gram of resin in the final product, in order to insure an adequate neutral salt concentration in case there is not enough normally present.

Tablets or molded products can thus be prepared of varying sizes, but advantageously a relatively large tablet or molded product is formed, having approximate dimensions of 4 cm. x 1 cm. x 1 cm. Such a tablet may advantageously contain around 0.5 gram of the resin plus 0.025 gram of sodium chloride with enough lactose as a diluent to form a tablet of the above dimensions, and with the admixture of a small amount of a water soluble binder such as gum acacia. The size of the tablet and the amount of resin which it contains can be varied, and one or more tablets used to obtain the proper dose for treatment. With the resin above described, doses as low as 120 mg. and as high as 2.5 grams can be used, but advantageously the tablets contain around 0.5 gram or somewhat more. Tablets containing as low as 120 mg. of resin with a proportional amount of sodium chloride and with lactose as a diluent have been prepared and satisfactorily used for treating vaginal infections, but in general somewhat larger amounts of around 0.5 gram or somewhat more are used.

The preparation of the new compositions in tablet form will be further illustrated by the following specific example:

The cation exchange resin "Amberlite XE112" was suspended in enough water to provide easy stirring, and 1.2 milliequivalents of sodium hydroxide were added per gram of resin. This mixture was stirred with an electric stirrer overnight. It was then filtered, washed with distilled water and dried in an electric oven at 130° C. The resulting hard cake was ground in a ball mill with the addition of 0.05 gram of sodium chloride per gram of resin to an 80 mesh powder.

This powder was made into compressed tablets by the usual procedures, using lactose as a diluent and acacia as a binder. Lactose has the advantage as a diluent that it is a good substrate for a large part of the normal vaginal flora. Tablets can be made containing various proportions of resin to lactose. Studies on the effects of sodium chloride concentration on the pH indicate that about 0.05 gram of sodium chloride per gram of resin is a desirable concentration for use in making the tablets.

Another advantageous method of forming the composition is to use a mixture of the "Amberlite XE112" resin in acid form and of the same resin in the form of the sodium salt, in proportions to give the desired initial pH of the resin mixture when tested as above described.

The compositions above described, when placed in the lower genital tract, disintegrate within five minutes, with resulting altering of the pH range of the low grade infection or infestation to a pH level of 3.5 to 4.5 almost immediately. And this pH level has been found to be maintained and to persist for observed periods of 24 hours or longer.

Because of the prolonged buffering action of the resins when properly prepared and used in suitable amount, it is possible to use one tablet a day, e. g., at bedtime, and maintain an approximately normal pH of the vaginal mucosa.

Thus, where vaginal infections are due to grade II or grade III bacterial flora, the prolonged action of the resins and the maintenance of the normal pH within the range of e. g. 3.5 to 4.5 enables this treatment to be continued for a period of a week or two or for the period required to reestablish the normal pH without further treatment.

Because of the prolonged action of the resins and their ability to take up relatively large amounts of alkalis or cations in the pH range of 3.5 to 5, I am led to believe that the action of the resins in the treatment of vaginal infections is largely or primarily due to the maintenance of the low acid pH. But I have found that these resins have another and different action, such that they are capable of functioning even at a higher pH of around 6.0, where their action results in the sequestering of cationic nutrient materials essential to the metabolism of the protozoa. In carrying out in vitro studies of the effect of the above ion exchange resins on *Trichomonas vaginalis*, in which the pH of the medium was maintained at 6.0, growth of the organism was progressively inhibited with increasing concentrations of the resin, and I have been led to believe that this inhibiting action is due to the sequestration of cationic nutrients essential to the growth of these organisms.

Tests with human serum indicate that the Amberlite XE112 resin markedly inhibited the growth of the organism in the serum.

In vitro experiments were conducted on four different strains of *Trichomonas vaginalis* by adding the modified ion exchange resin in the acid form to the simplified trypticase serum media (Trussell, M.: *Trichomonas vaginalis* and trichomoniasis, Springfield, Ill., Thomas, 1947) just prior to inoculation with pathogenic strains of the *Trichomonas vaginalis*. It was found that a concentration of 6.0 mg. of resin per cc. of solution was completely inhibitory of all four strains. The resulting pH of the medium at this concentration of the resin was 5.2–5.3. Other tests were carried out where the acidic form of the ion exchange resin above referred to and the sodium salt form (completely neutralized resin) were added to the culture medium in such ratios that the normal pH of the medium (pH 6.0) was not altered. Partial inhibition was brought about in some cases, and complete inhibition in others, depending on the amount and proportions of the resins used.

These in vitro studies of the effect of the ion exchange resin on *Trichomonas vaginalis*, in which the pH of the medium was maintained at 6.0, showed that growth of the organism was progressively inhibited with increasing concentration of the resin, indicating the sequestering action of the resin on nutrients essential to the growth of the organisms.

The process in which the resins are used at a pH of around 6.0 is a different process from that above described, in which a pH of around 3.5 to 5 is maintained in the vaginal mucosa. But the action of the resins at the higher pH in inhibiting the growth of the organisms indicates that the resins have an inhibiting action which is different from or in addition to their action in maintaining the normal pH in the vaginal mucosa and the inhibition of the organisms due thereto.

This application is a continuation-in-part of my prior application Ser. No. 409,218, filed February 4, 1954, now abandoned. Clinical results from the use of the invention are described in an article in "Obstetrics and Gynecology" for November 1955, vol. 6, No. 5, pages 532–537.

I claim:

1. The process of establishing and maintaining a controlled pH of the vaginal mucosa in the treatment of vaginal infections which comprises introducing into the vagina a carboxylic acid cationic ion exchange resin having a pH from about 2.8 to about 3.5 in a dosage amount between about 0.12 and 5.0 grams sufficient to maintain the pH of the vaginal mucosa between about 3.5 and 5.0 for prolonged periods of time.

2. The process according to claim 1 in which there is introduced with the resin a small amount of sodium chloride.

3. The process according to claim 1 in which the resin is introduced in admixture with lactose.

4. The process according to claim 1, in which the resin, admixed with a diluent, is formed into a shaped article containing the dosage amount of the resin and suitable for introduction into the vagina.

5. The process according to claim 1 in which the resin is admixed with a small amount of sodium chloride, lactose in amount sufficient to form a tablet, and a table binder, and in which a tablet containing the above ingredients and the resin in dosage amount is introduced into the vagina.

6. The process of establishing and maintaining a controlled pH of the vaginal mucosa in the treatment of vaginal infections which comprises introducing into the vagina a tablet containing a carboxylic acid cationic ion exchange resin having its pH initially adjusted to at least about 2.8 and capable of combining with relatively large amounts of alkalies in the pH range of 3.5 to 5.0, said tablet containing from about 0.12 to about 5.0 grams of the resin, together with a small amount of sodium chloride and lactose as a diluent.

7. The process according to claim 6, in which the tablet has the following ingredients in approximately the following proportions: resin—0.5 gram, sodium chloride—about 0.025 gram, a water soluble tablet binder, and sufficient lactose to form a tablet having the approximate dimensions of 4 cm. x 1 cm. x 1 cm.

8. An anti-vaginitis composition containing as an essential ingredient a carboxylic acid cation exchange resin having its pH initially adjusted to at least about 2.8 and capable of combining with large amounts of alkalis at the pH range of 3.5 to 5.0, said composition also containing a diluent and being in the form of an insert suitable for insertion into the vagina, which insert contains an amount of the resin between about 0.12 and 5.0 grams sufficient to maintain the pH of the vaginal mucosa between about 3.5 and 5.0 for prolonged periods of time.

9. A composition as defined in claim 8 in the form of a tablet containing a small amount of sodium chloride and lactose as its principal diluent.

10. A composition as defined in claim 8 containing about 0.5 gram of the resin and about 0.025 gram of sodium chloride.

(References on following page)

References Cited in the file of this patent

UNITED STATES PATENTS

| | | |
|---|---|---|
| 1,263,486 | Thorne | Apr. 23, 1918 |
| 1,599,488 | Richter | Sept. 14, 1926 |
| 1,723,800 | Michael et al. | Aug. 6, 1929 |
| 1,804,967 | Wolf et al. | May 12, 1931 |
| 1,908,615 | Oman | May 9, 1933 |
| 1,955,057 | Dunbar | Apr. 17, 1934 |
| 2,029,360 | Dean | Feb. 4, 1936 |
| 2,152,267 | Merrill | Mar. 28, 1939 |
| 2,165,644 | Merrill et al. | July 11, 1939 |
| 2,205,374 | Dunbar | June 18, 1940 |
| 2,221,066 | Kahle | Nov. 12, 1940 |
| 2,225,771 | Dunbar | Dec. 24, 1940 |
| 2,494,098 | Lockman | Jan. 10, 1950 |
| 2,501,927 | Block | Mar. 28, 1950 |
| 2,649,398 | Wright | Aug. 18, 1953 |
| 2,673,827 | Kohlstaedt | Mar. 30, 1954 |
| 2,684,321 | Thurmon et al. | July 20, 1954 |

FOREIGN PATENTS

| | | |
|---|---|---|
| 43,007 | Norway | July 26, 1926 |

OTHER REFERENCES

Karnaky: Clinical Med., October 1953, vol. 60, No. 10, pp. 527–531.

Mukherjee et al.: J. Indian Chemical Soc., April 1950, vol. 27, No. 4, pp. 156–168.

Lesser: Drug and Cosmetic Ind., January 1952, vol. 70, No. 1, pp. 40, 41, 128–133.

UNITED STATES PATENT OFFICE

CERTIFICATE OF CORRECTION

Patent No. 2,823,163                                    February 11, 1958

Richard K. Thoms

It is hereby certified that error appears in the printed specification of the above numbered patent requiring correction and that the said Letters Patent should read as corrected below.

Column 6, line 38, for "table" read -- tablet --; column 7, line 4, list of references cited, beginning with 1,263,486     Thorne ------ Apr. 23, 1918 strike out all to and including 2,494,098     Lockman ---- Jan. 10, 1950 in column 8, line 1; same column 8, lines 6 to 8, strike out

"FOREIGN PATENTS 43,007     Norway ------ July 26, 1926".

Signed and sealed this 15th day of April 1958.

(SEAL)
Attest:

KARL H. AXLINE                                               ROBERT C. WATSON
Attesting Officer                                        Commissioner of Patents